Jan. 31, 1967   A. T. BRIGGS   3,301,235
AIR SCAVENGING STRUCTURE FOR INTERNAL COMBUSTION ENGINES
Filed Dec. 16, 1964   4 Sheets-Sheet 1

INVENTOR.
ARTHUR T. BRIGGS
BY
ATTORNEYS.

Jan. 31, 1967     A. T. BRIGGS     3,301,235
AIR SCAVENGING STRUCTURE FOR INTERNAL COMBUSTION ENGINES
Filed Dec. 16, 1964     4 Sheets-Sheet 2

INVENTOR.
ARTHUR T. BRIGGS
BY *Alden W. Redfield*
*Maurice W. Green*
ATTORNEYS.

Jan. 31, 1967  A. T. BRIGGS  3,301,235
AIR SCAVENGING STRUCTURE FOR INTERNAL COMBUSTION ENGINES
Filed Dec. 16, 1964  4 Sheets-Sheet 4

INVENTOR.
ARTHUR T. BRIGGS
BY
ATTORNEYS.

3,301,235
AIR SCAVENGING STRUCTURE FOR INTERNAL COMBUSTION ENGINES
Arthur T. Briggs, South Williamsport, Pa., assignor to Avco Corporation, Williamsport, Pa., a corporation of Delaware
Filed Dec. 16, 1964, Ser. No. 418,665
11 Claims. (Cl. 123—55)

This invention relates to a cylinder, crankcase, and air scavenging structure for an internal combustion engine for forcing scavenging air through a cylinder combustion region from circumferentially positioned inlet ports to an exhaust outlet.

The invention provides an air reservoir laterally and longitudinally of the engine extending under the air inlet connections between the scavenging air reservoir and port connections in the cylinder, thus eliminating complicated lateral air ducts. Improvement is also afforded in efficiency of air movement through the scavening system, resulting in increased engine power, by provision of means restricting air flow in certain regions of the air reservoir prior to its movement to the inlet ports of the cylinder.

The structure also affords a simplification of the air reservoir by extending it both between the cylinders and under and around the cylinders with the reservoir formed substantially over the width and length of the crankcase with the volume of the reservoir reduced in material extent only by cylinder skirt portions projecting through the chamber.

The scavenging air reservoir is formed above and substantially integral with the crankcase of the engine with top walls of the reservoir forming support surfaces for the cylinders and the bottom wall portion forming a dividing wall between the reservoir and the oil containing crank chamber of the engine, with skirt portions of the cylinders extending through and supported in aligned openings in the top wall and dividing bottom wall of the scavenging chamber and sealed therein to complete the scavenging reservoir.

The accompanying drawings disclose an illustrative structure incorporating the principles of the invention as applied to a two-cycle compression-ignition engine, wherein:

FIGURE 5 is a vertical sectional longitudinally of the engine through the central portion of the air reservoir and the scavenging air fan and its drive;

Figure 1:
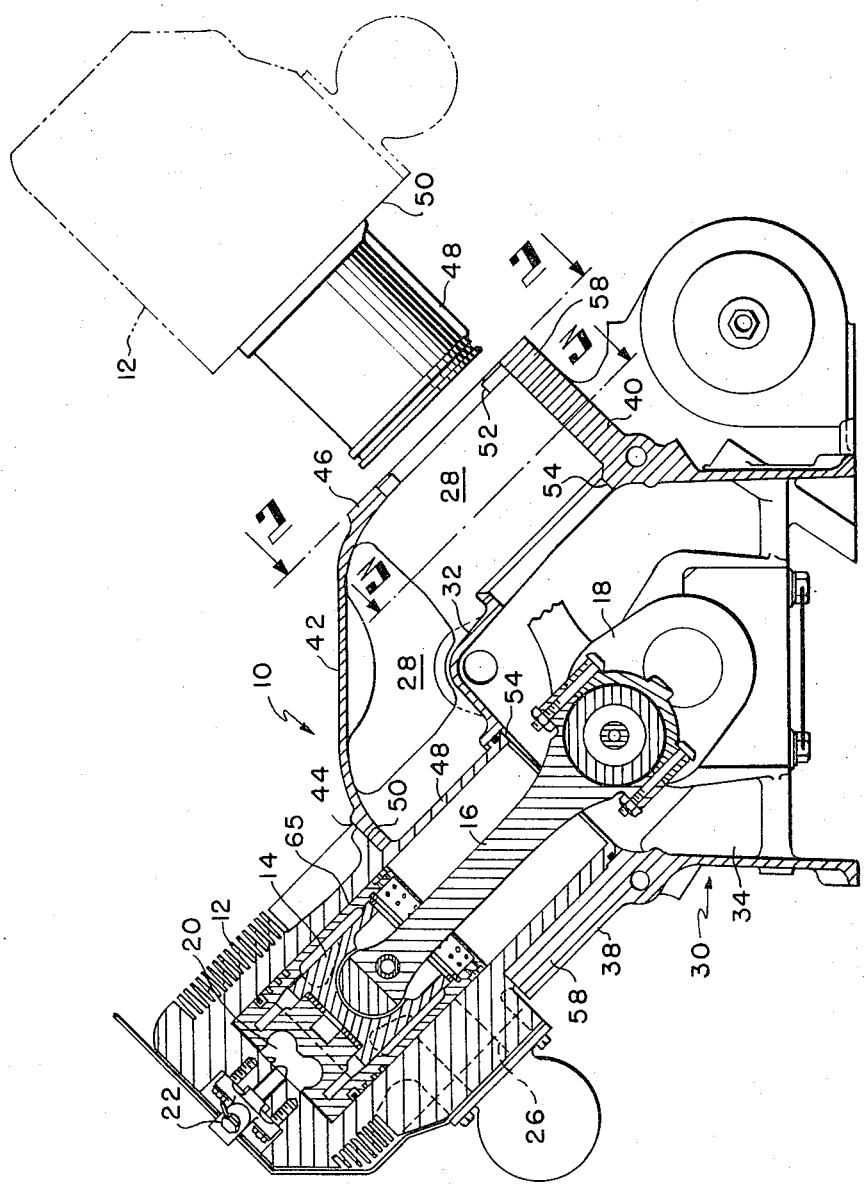
FIGURE 1 is a transverse section through the crankcase and scavenging air reservoir of a V-type engine, including a section through a cylinder of one bank assembled to the crankcase and showing a cylinder of the other bank in position to be assembled into aligned openings in the air reservoir.
Figure 8:
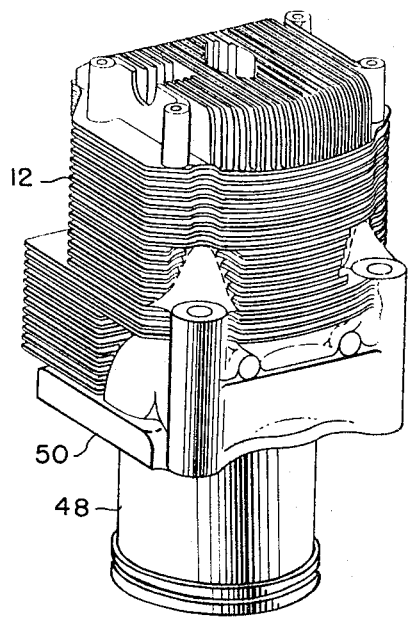
FIGURE 8 is a perspective view of the cylinder prior to assembly and apart from the engine.

Referring to the drawings and particularly to FIGURE 1, there is shown a transverse section of a V-type engine 10 of the two-cycle compression-ignition type employing an air scavenging system. One of the cylinders 12 is shown in cross section in FIGURE 1, having a reciprocating piston 14, connecting rod 16, and crank 18, and in the position shown in FIGURE 1 the piston is at top position where compression ignition occurs when fuel has been fed into the compressed combustion chamber 20 by the fuel injection nozzle 22. After ignition occurs, the piston moves downwardly to the position shown in FIGURE 6, uncovering inlet ports 24 and outlet or exhaust ports 26. In order that the burned gases may be scavenged from the cylinder, an air scavenging system is necessary to feed air under pressure from an air scavenging reservoir 28. This reservoir is constructed on top of a crankcase 30 and has a lower wall 32 which extends from the center of the V arrangement to the outer walls of the crankcase 30 and forms a dividing wall between the crank chamber 34 and the air reservoir 28. The air reservoir 28 extends in laterally extending relationship over the crankcase to outer walls 38, 40. There is also provided an upper wall 42 of this air reservoir, which extends upwardly spaced from and over the lower wall 32 and forms cylinder supporting surfaces 44, 46. In the V-type engine disclosed there are four cylinders 12 of the general type shown in FIGURE 8. These cylinders have lower skirt portions 48 and radially projecting shoulder-supporting surfaces 50. In assembly of these cylinders 12 the skirt portions 48 are inserted into openings 52 in the top wall 42 of the scavenging air reservoir and extend downwardly into aligned openings 54 in the lower wall 32 of the reservoir 28. FIGURE 1 shows a cylinder 12 in position ready to be inserted into the openings 52, 54, as above described, and it is noted that when the cylinder is in position shown on the left hand bank of FIGURE 1 the shoulder 50 rests on the supporting surface 44 and the lower end portion of the skirt 48 is inserted in the opening 54 with suitable close fitting clearance, or other sealing means, to provide a sealing sufficient to close the aligned openings 52, 54 and thereby to complete a closed chamber 28 with lateral portions thereof extending around the cylinder skirt portions in such manner that the effective reservoir extends across the engine and surrounds the skirt portions of the cylinders when in position. The air reservoir 28 is therefore substantially a box of V cross section extending substantially the full width, as well as the full length, of the crankcase with its volume reduced by the cylinder skirt portions 48 extending through the space, together with such other projections as may be necessary in the reservoir.

Figure 2:
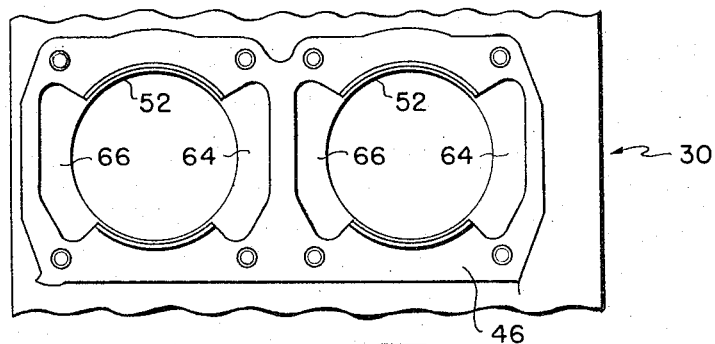
FIGURE 2 is a view on the line 2—2 of FIGURE 1, the cylinders not being assembled, showing particularly the openings in the top of the reservoir to feed air directly into the inlet port connections of the cylinders.
Figure 3:
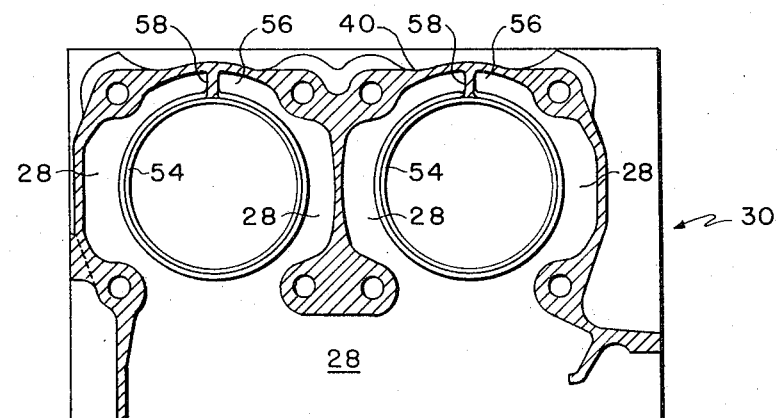
FIGURE 3 is a sectional view on the line 3—3 of FIGURE 1, the cylinders not being assembled, showing a cross section through the reservoir in the region adjacent the lower skirt portions of the cylinders and shows the baffle air flow restricting means between the cylinder skirt portions and the outer wall of the reservoir.
Figure 4A:
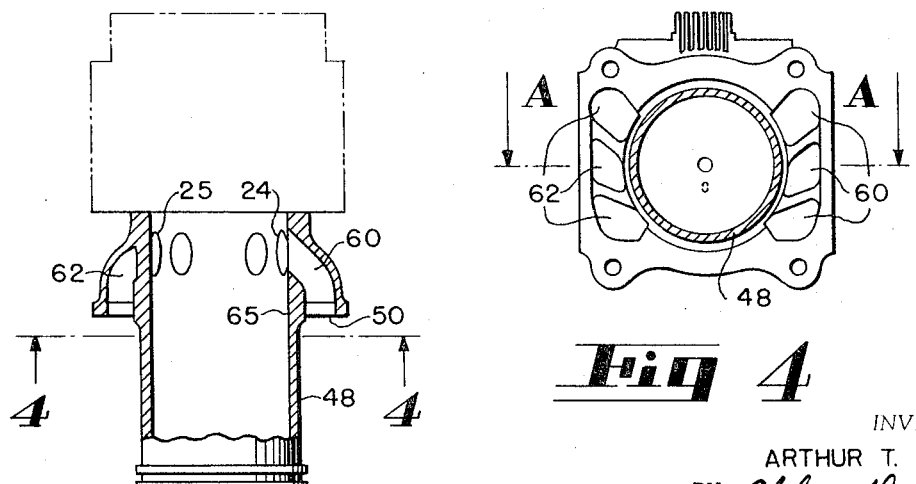
FIGURE 4A is a section on the line A—A of FIGURE 4 and is a section through the cylinder showing the inlet ports and connections thereto, as well as the outlet ports.
Figure 4:
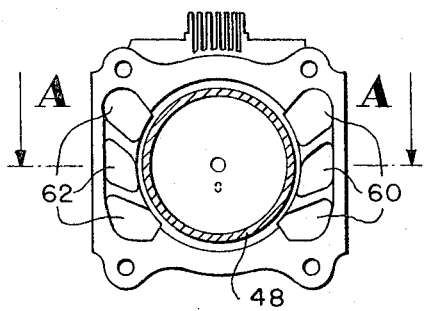
FIGURE 4 is a view on the line 4—4 of FIGURE 4A and shows the connections to the cylinder inlet ports in the region where air is received directly from the air reservoir located under the port connections.
Figure 3:
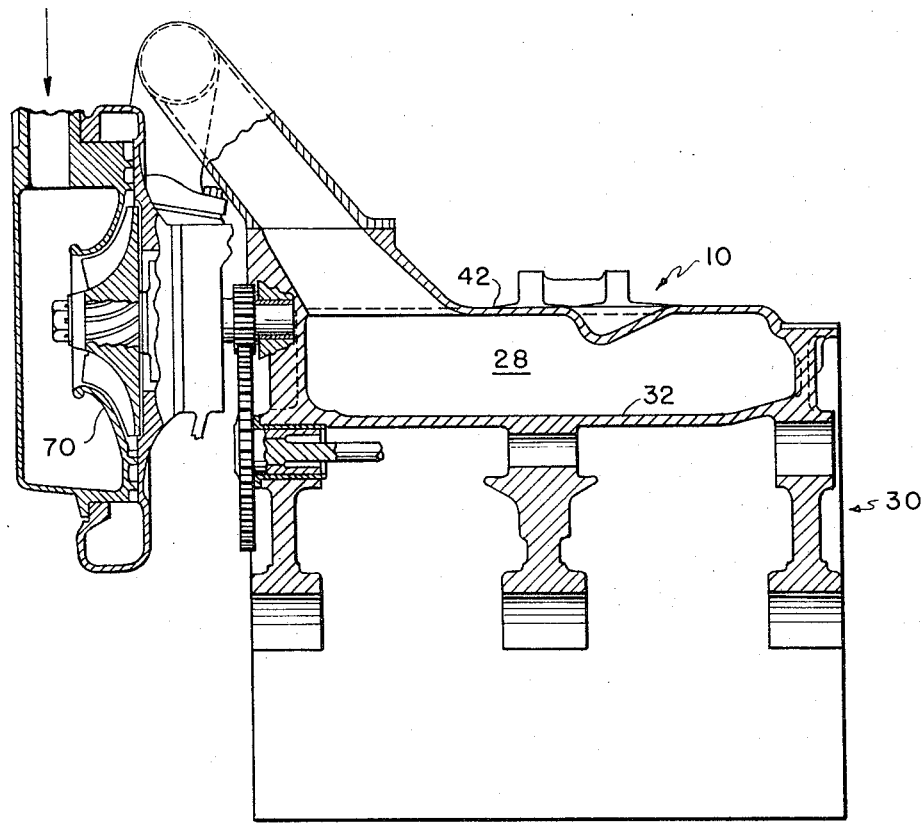
Figure 6:
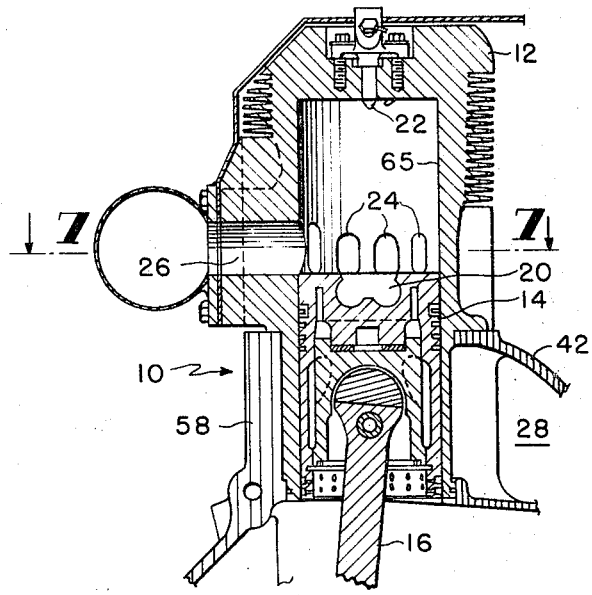
FIGURE 6 is a section through a cylinder and piston, similar to the section in FIGURE 1 but showing the piston in the downward position exposing the inlet and outlet ports for air scavenging of the combustion region.
Figure 7:
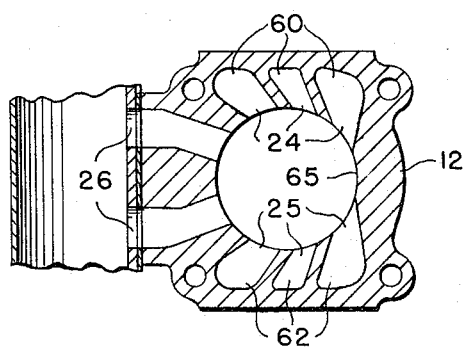
FIGURE 7 is a section on the line 7—7 of FIGURE 6 showing the inlet and exhaust ports and their locations relative to the cylinder.

It is noted that the periphery of the cylinder skirt portions 48 extend parallel to the outer wall portions 38, 40 of the reservoir and that there is a space 56 (see FIGURE 3) between these walls and the periphery which is closed by a projecting baffle 58. This baffle, comprising an air flow restriction, is an important feature of this invention and is provided between the outer wall and the periphery of the skirt portion adjacent each of the four cylinders, as shown in cross section in FIGURE 3. As shown in FIGURE 4, as well as in FIGURE 7, there are provided in the walls of each cylinder 12 two groups of connections 60 and 62 for inlet ports 24 and 25, one such group diametrically on each side of the cylinder. These port connections extend upwardly from the shoulders 50, as shown in FIGURE 4A, closely adjacent to the combustion chamber wall 65 and terminate in inlet ports 24, as shown in FIGURE 6. FIGURE 7 also shows a cross section through the cylinder and shows the relationship of these groups of inlet ports 24, 25 and connections 60 and 62 to the combustion chamber wall 65, as well as the relationship of these inlet ports to the exhaust ports 26. Specifically, the inlet and exhaust ports are in substantially the same plane and, although the exhaust port is slightly higher and is uncovered first in the downward movement of the piston, the ports 24 and 26 are open at the same time when the piston reaches its maximum downward position. At that time the air under pressure from the air reservoir must be forced into the inlet port connections 60, 62 and for this purpose, as shown best in FIGURE 2, openings are provided in the top of the wall of the reservoir coinciding with the groups of inlet connections 60, 62 so that the air from the reservoir through the openings 64, 66 in the top wall coincide with the inlet connections 60, 62, as shown in FIGURE 4. Thus there is a direct vertical movement of air from the reservoir through the openings 64, 66 into the two groups of inlet port connections 60, 62 on opposite sides of the cylinder walls 65. As shown in FIGURE 3, the air which comes from the central portion of the reservoir 28 between the V is supplied in the lateral extensions of the reservoir 28 under the cylinders, as well as in the central portion thereof and therefore is under pressure and forced upward into the inlet port connections 60, 62 and out the inlet ports 24, 25 into the cylinder (see FIGURE 4A). A circulation of air takes place inside the cylinder, forcing air and exhaust gases out the outlet or exhaust ports 26. Such an air movement is known as loop scavenging for the purpose of removing burned gases from the cylinder in order that a subsequent compression and fuel injection will result in a satisfactory succeeding power stroke.

Concerning the air restricting means in the form of the baffles 58, closing the space between the outer walls 38, 40 and the periphery of the lower skirt portions of each cylinder, it has been noted in tests made with and without such baffle restriction that there is a material increase in horsepower output of the engine when the baffle is added. Such baffle is considered, as a result of these tests, to equalize the flow of scavenging air between the two groups of inlet connections 60 and 62 and ports 24 fed thereby. It has been determined that this restricting baffle acts to prevent circulation across the back side of the cylinder skirt and to afford more stable pressures under the outlet regions 64, 66 which feed air directly from the air scavenging reservoir to the inlet connections 60, 62 and thus to the inlet ports 24, 25 positioned on diametrically opposite sides of the cylinders, forcing air and combustion products through the cylinder combustion chamber and out the exhaust ports 26, thereby to prepare the cylinder for subsequent compression of relatively clean air to be compressed and to receive subsequent injections of fuel for subsequent power strokes of the piston.

As shown in FIGURE 5, the reservoir 28 is fed by an air compressor 70, positioned at one end of the cylinder block and feeding air to an inlet connection 72 to the reservoir 28. Thus, the air forced into the reservoir 28 is fed to the several cylinders to scavenge the products of combustion. This is accomplished, as will be understood from the above description, by the fact that air under some pressure is available in the reservoir 28 which reservoir extends under and surrounding the skirt portions 48 of the cylinders when they are in position and, as has been previously described, the openings 64, 66 in the upper wall of the reservoir feed the two groups of inlet connections 60, 62 on diametrically opposite sides of the cylinder and therefore feed air into the cylinder for scavenging when the piston is in its downward position to uncover the inlet ports 24, 25, as well as the outlet ports 26, thus completing the circulation for air scavenging.

Although the invention has been described by reference to a specific structure found practical in actual operation, it is understood that various modifications are intended without departing from the principles above disclosed and within the scope of the following claims.

I claim:

1. A cylinder, crankcase, and air scavenging structure for an internal combustion engine of the type employing a scavenging air system for forcing air through a cylinder combustion region from circumferentially positioned cylinder inlet ports to an exhaust outlet, comprising:

a cylinder having a lower skirt portion;

a crankcase including a crank chamber;

a scavenging air reservoir formed above said crank chamber;

an upper wall of said reservoir providing a cylinder supporting surface;

a lower wall of said reservoir dividing said crank chamber and said scavening air reservoir;

aligned upper and lower cylinder receiving openings in said upper and lower walls to receive said lower skirt portion of said cylinder;

means sealing said skirt portion of said cylinder in said upper and lower cylinder receiving openings, thereby to complete said scavenging air reservoir;

cylinder inlet port connections positioned to receive scavenging air directly from said reservoir through openings in said upper wall adjacent said cylinder;

an outer wall of said reservoir extending adjacent each said cylinder skirt portion;

and air flow restricting means between said outer wall and each said skirt portion.

2. Structure as in claim 1 in which said air flow restricting means comprises adjacent structures of said outer wall and said skirt portion formed to restrict air flow in said chamber around said cylinder skirt portion.

3. Structure as in claim 1 in which said air flow restricting means comprises adjacent structure of said outer wall and said skirt portion formed to close space between said wall and said cylinder skirt portion.

4. Structure as in claim 1 in which said air flow restricting means comprises a baffle projecting between said outer wall and said cylinder skirt portion.

5. In an internal combustion engine of the type employing a scavenging air system for forcing scavenging air through a cylinder combustion region from circumferentially positioned cylinder inlet ports to an exhaust outlet;

a plurality of cylinders, each having a lower skirt portion;

a crankcase including a crank chamber;

a scavenging air reservoir formed above said crank chamber;

oppositely extending top wall portions of said reservoir providing cylinder-supporting surfaces for V-arranged cylinders;

a lower wall of said reservoir dividing said crankcase chamber and said scavenging air reservoir;

aligned upper and lower cylinder receiving openings in said upper and lower walls, positioned to receive said lower skirt portions of said V-arranged cylinders;

means sealing said skirt portions of said cylinders in said upper and lower cylinder receiving openings, thereby to seal said scavenging air reservoir;

outer walls of said reservoir outside said cylinder walls and extending adjacent and substantially parallel to said cylinder axes, thereby completing a scavenge air reservoir formed substantially as a box extending substantially over the width and length of said crankcase with the volume of said reservoir reduced by said cylinder skirt portions projecting through said chamber;

inlet port connections of each of said cylinders positioned to receive scavenging air directly from said reservoir through openings in said upper wall adjacent each of said cylinders;

an air flow restricting means between said outer walls and each of said lower skirt portions of said cylinders.

6. Structure as in claim 5 in which said air flow restricting means comprises a projecting structure between each of said skirt portions and its adjacent outer wall formed to restrict air flow in said chamber around said skirt portions.

7. Structure as in claim 5 in which said air flow restricting means comprises a projecting structure between each of said skirt portions and its adjacent outer wall formed to close space between said walls and said skirt portions.

8. Structure as in claim 5 in which said air flow restricting means comprises baffles projecting between said outer walls and said skirt portions.

9. In an internal combustion engine of the type employing a scavenging air system for forcing scavenging air through a cylinder combustion region from circumferentially positioned cylinder inlet ports to an exhaust outlet;

a plurality of cylinders each having a lower skirt portion;

a crankcase including a crank chamber;

a scavenging air reservoir formed above said crank chamber;

oppositely extending top wall portions of said reservoir providing cylinder supporting surfaces for V-arranged cylinders;

a lower wall of said reservoir dividing said crankcase chamber and said scavenging air reservoir;

aligned upper and lower cylinder receiving openings in said upper and lower walls, positioned to receive said lower skirt portions of said V-arranged cylinders;

means sealing said skirt portions of said cylinders in said upper and lower cylinder receiving openings, thereby to seal said scavenging air reservoir;

outer walls of said reservoir outside said cylinder walls and extending adjacent and substantially parallel to said cylinder axes, thereby completing a scavenge air reservoir formed substantially as a box extending substantially over the width and length of said crankcase with the volume of said reservoir reduced by said cylinder skirt portions projecting through said chamber;

inlet port connections of each of said cylinders arranged in two groups longitudinally of the engine, one group on each side of each of said cylinders, said port connections positioned to receive scavenging air directly from said reservoir through openings in said upper wall adjacent each of said cylinders;

an air flow restricting baffle closing the space from the outer wall to the periphery of each of said cylinder skirt portions.

10. A scavenging air system for supplying air to the inlet ports of a two-cycle engine having inlet port connections extending upwardly from a laterally extending support shoulder of said cylinder to inlet ports in said cylinder, comprising:

cylinders having lower skirt portions;

a crankcase including a crank chamber;

a reservoir formed above the crankcase of said engine and having laterally extending portions extending to surround lower skirt portions of said cylinders located in opposed V-bank formation;

an upper wall of said reservoir extending from the central V of said engine in downwardly extending cylinder supporting surfaces;

a lower wall of said chamber spaced downwardly from said upper wall and defining division between the crank chamber and said reservoir;

aligned vertically spaced openings in the laterally extending portions of said reservoir upper and lower walls positioned to receive lower skirt portions of said cylinders and to complete said resevoir;

the periphery of said lower skirt portion of each cylinder extending substantially parallel and adjacent to but spaced from the adjacent outer wall of said reservoir;

and baffles, one extending from said adjacent outer wall to the periphery of each of said lower skirt portions of said cylinders;

inlet port connections of each of said cylinders arranged in two groups longitudinally of the engine, one group on each side of each of said cylinders;

upper outlet openings from said reservoir positioned to connect with said inlet port connections of each of said cylinders through a top wall of said reservoir and serving two groups of inlet connections for each cylinder, one on each side of each said baffle.

11. In an air scavenging structure for a two-cycle engine of the type having an air inlet and exhaust ports in each cylinder with inlet connections to said inlet ports, comprising:

a plurality of cylinders each having a lower skirt portion;

a reservoir chamber extending under and around the lower portion of each cylinder;

upper and lower walls of said chamber provided with aligned openings to receive said lower portion of each said cylinder;

the outer walls of said reservoir spaced outside the cylinder walls and adjacent the skirt portions;

the lower wall of the reservoir in the lower plane of the end of each said cylinder skirt having openings closed by said aligned cylinder ends to retain the scavenged air;

thereby to define an air reservoir surrounding said lower skirt portion of each said cylinder with space between said cylinder periphery and its adjacent outer wall;

and a baffle extending from said outer wall to said periphery of each said skirt portion thereby to stabilize air pressure in said chamber around said cylinder;

said upper wall of said chamber having openings therein on diagrammatically opposite sides of each said aligned cylinder receiving opening in said upper wall;

said cylinder inlet connections to said inlet ports positioned above said openings in said upper wall, thereby to receive scavenging air from said reservoir directly therethrough.

No references cited.

MARK NEWMAN, *Primary Examiner.*

W. E. BURNS, *Assistant Examiner.*